Patented Dec. 16, 1947

2,432,586

UNITED STATES PATENT OFFICE 2,432,586

STABILIZED CHLORINE-CONTAINING RESINS

Richard W. Quarles, Pittsburgh, Pa., assignor to Carbide and Carbon Chemicals Corporation, a corporation of New York No Drawing. Application January 17, 1946,
Serial No. 641,863

10 Claims. (Cl. 260—45.5)

The subject of this invention is a plastic composition including a chlorine-containing resin which is stabilized against deterioration caused by heat.

It is well known that films deposited from coating compositions composed of chlorine-containing resins normally are susceptible to decomposition on exposure to heat. This decomposition is accompanied by the discoloration or darkening of the film, and in many instances, the elimination of hydrogen chloride has been detected. The deterioration of chlorine-containing resins is accelerated by the presence of metals, particularly the more chemically active metals, such as iron and zinc, over which protective resinous coatings are commonly employed. Consequently, chlorine-containing resins, which require baking for adequate adhesion or which otherwise will be subjected to heat, cannot be utilized alone as coatings over most metal surfaces in commercial use. The decomposition of these chlorine-containing resins is especially severe in that any hydrogen chloride released in the initial discoloration is a catalyst for further rapid deterioration of the resin.

Recognition of these facts have led to two different proposals in the art; one involves forming a protective film between the chlorine-containing resin and the metal surface, and the other involves the addition of basic materials, both organic and inorganic, to the composition for the purpose of inhibiting the release of hydrogen chloride or reacting with the hydrogen chloride released. The former proposal makes use of expedients, such as primer coatings, between the heat sensitive resin and the metal as well as pretreatment of the metal surface by the well-known bonderizing or phosphatizing operations, and these expedients in themselves are not wholly adequate. The disadvantages of the latter proposal are dual. One is that the inorganic basic materials with few exceptions are insufficiently compatible with the chlorine-containing resins so that clear compositions cannot be obtained. The other is that the organic basic materials heretofore proposed have themselves caused partial discoloration of the chlorine-containing resins, even though they tend to prevent blackening and release of hydrogen chloride. It has been found that the organic basic materials proposed by the art, whether they be monomeric nitrogen compounds, such as urea or triethanolamine, or polymeric nitrogen compounds, such as polymeric amino-alcohol esters of alpha-substituted acrylic acids, or reaction products of diphenylguanidine with formaldehyde, or of triethanolamine with polycarboxylic acids, have contained nitrogen atoms of sufficient basicity to cause discoloration of chlorine-containing resins when included therein as stabilizers. It is believed that even the less basic nitrogen compounds cause this discoloration by their tendency to actually split off hydrogen chloride from the resin and combine with it. For instance, a film of a conjoint polymer of vinyl chloride and vinyl acetate containing 2% of urea was a deep red color after baking on steel for 30 minutes at 350° F., although the film had not become black or lost its strength as do films of the unstabilized resins after being subjected to these conditions for but a few minutes.

According to this invention, a class of nitrogen-containing organic stabilizers have been developed which are capable of combining with hydrogen chloride but are not so basic as to cause films of chlorine-containing resins including such stabilizers to become discolored on baking. Furthermore, the new stabilizers are not subject to the disadvantages of water solubility and volatility which accompany many of the nitrogen-containing compounds heretofore proposed as stabilizers. The nitrogen-containing substances of this invention are compatible with chlorine-containing resins in the proportions necessary for stabilization and they have the additional advantages of chemical stability, absence of undesirable color, and less toxicity than the lead pigments commonly employed as stabilizers.

The nitrogen-containing stabilizers of this invention consists of the class of resinous ester-amides of secondary aryl monoalkylolamines containing from two to three carbon atoms in the alkylol radical and having the hydroxyl group in the beta position with dicarboxylic acids. The presence of the aryl group and of the amide group in these compounds is believed to be responsible for the nitrogen-containing stabilizers being insufficiently basic to cause discoloration of the chlorine-containing resin. The resinification appears to proceed through the formation of both ester and amide linkages.

Aryl monoalkylolamines which may be reacted with dicarboxylic acids to form resinous stabilizers for chlorine-containing resins include phenyl monoethanolamine, phenyl monoisopropanolamine, o-, m- and p-toluidyl monoethanolamine and naphthyl monoethanolamine. Aryl monoalkylolamines of the class described may be made by reacting aromatic primary amines with alkylene oxides, for instance by reacting one mol of ethylene oxide with one mol of aniline.

We prefer to react the ethylene oxide with an excess of aniline in order to obtain a predominant quantity of the monoethanolamine derivative. For example, by reacting one mol of ethylene oxide with five mols of aniline at 40–50° C. the product was predominantly the mono derivative. This was separated from the unreacted aniline and a product which boils at 175° C. at 20–22 mm. was obtained.

Any dicarboxylic acid or its anhydride may be used with an aryl monoalkylolamine to form a resinous ester-amide stabilizer for chlorine-containing resins. The principle of the invention is the same irrespective of the polycarboxylic acid employed, and it is obvious that all compounds embraced within the term "dicarboxylic acid" are included within the scope of the invention irrespective of whether they are of the cyclic or acylic series of organic dicarboxylic acids. Within the class of cyclic dicarboxylic acids are included heterocyclic acids and carbocyclic acids, such as monocyclic, polycyclic and endocyclic acids. Within the class of dicarboxylic acids, representative acids have been used in the preparation of resinous ester stabilizers for chlorine-containing resins and the equivalency of the members of this class has been established. The dicarboxylic acids which have been thus employed include phthalic acid, maleic acid, succinic acid, adipic acid, endomethylene tetrahydrophthalic acid, endomethylene hexahydrophthalic acid and a bicyclic acid formed by the reaction of a mixture of terpenes and maleic anhydride. Other examples of suitable dicarboxylic acids include malonic, glutaric, pimelic, malic, itaconic, citraconic, fumaric, isosuccinic, sebacic, diglycolic, dilactic, diphenic, 1,8-naphthalic and camphoric acids, as well as the entire class of acids which may be formed by the Diels Alder reaction of maleic anhydride with compounds containing conjugated double bonds, including hydrocarbons, such as cyclopentadiene, piperylene, isoprene and terpenes; and with unsaturated heterocyclic compounds, such as furan. While they are not preferred, compounds such as chlorphthalic acid may be used in the practice of the invention.

A typical method of preparation of the resinous aryl ester-amide stabilizers is given below.

In a flask equipped with a stirrer, 151 parts by weight (one mole) of phenyl monoisopropanolamine

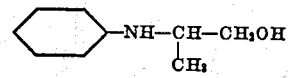

were heated with 118 parts by weight (one mole) of succinic acid. The temperature was raised slowly, over a period of several hours, from room temperature to 140–170° C. and the water of reaction was removed. Toward the end of the reaction, about 100 parts of a naphtha of high flash point were added to facilitate the removal of the last portion of the water and to reduce the viscosity of the mixture. The reaction was continued until 34.2 parts of water had been removed, and most of the naphtha distilled over in this period. The reaction product was a resin which was readily soluble in the usual lacquer solvents, such as ketones.

It is an established fact that chlorine-containing resins do not have unlimited resistance to heat, and that they are susceptible to stabilization to inhibit the release of hydrogen chloride and to increase their resistance to thermal deterioration. Accordingly, the invention provides a class of stabilizers which are of definite assistance in increasing the thermal stability of chlorine-containing resins which are subject to deterioration by heat and which tend to become brittle, discolored, blackened, or otherwise decomposed under these conditions. Such resins include polymers of vinyl chloride; conjoint polymers of vinyl chloride with vinyl esters of aliphatic acids, with esters of acrylic and methacrylic acids, and with acrylic nitrile; after-chlorinated polymers and conjoint polymers of vinyl chloride; polymers of vinylidine chloride and conjoint polymers of vinylidine chloride with vinyl chloride and other polymerizable compounds; polymers of vinyl chloroacetate, chlorostyrene and dichlordivinyl ether; chlorinated polymers of vinyl acetate and of styrene and chlorinated polymeric esters of acrylic and alpha-substituted acrylic acids; chlorinated rubbers, such as those containing from 50% to 70% chlorine; chlorinated resinous polymers of ethylene; polymers of 2-chlorobutadiene and after-chlorinated polymers of 2-chlorobutadiene; rubber hydrochloride and chlorinated rubber hydrochloride.

The resinous aryl ester-amides of aryl monoalkylolamines and dicarboxylic acids of the class described are particularly effective stabilizers for resins containing polymerized vinyl chloride, which are extensively employed as surface coatings and in plastic compositions of all types. The new stabilizers are especially adpated for use with conjoint polymers of vinyl chloride with vinyl esters of aliphatic acids, notably acetic, when they are baked over metal surfaces to improve the adhesion. These resins may contain from 60% to 98% vinyl chloride, and their molecular weight may vary from 8000 to 22,000, or higher, (as determined by the method of Douglas and Stoops Ind. & Eng. Chem. 28, 1152 (1936)), depending on the type of coating which is desired. These coatings are tough, adherent, and extremely resistant to oils, water, chemicals and many of the common solvents.

The amount of stabilizer required with the chlorine-containing resins is small and amounts from 0.5% to 8% of the resin to be stabilized are preferably employed. Larger amounts of stabilizers are effective but in certain instances, they tend to cause color in the resin.

The flexibility and adherence of stabilized coatings comprising the chlorine-containing resins can be increased by the inclusion in the coating of small amounts of alkyd resins which do not contain nitrogen atoms. Any resin of the alkyd type, i. e. formed by reacting a polyhydric alcohol with a polycarboxylic acid can be employed. Examples of such resins include the reaction products of glycerol with phthalic anhydride and adducts of terpenes and other conjugated dienes with maleic anhydride. A number of such resins have been tested, and the commercial type may be described as castor oil modified glycerolphthalic anhydride resins and other non-drying oil modified alkyd resins, drying oil modified alkyd resins, phenol modified alkyd resins, and unmodified alkyd resins from glycols and terpene-maleic anhydride addition products. These alkyd resins, when included in baked coatings consisting of chlorine-containing resins as the principal film-forming ingredient, also reduce the baking temperature required to effect adequate adhesion. While we prefer to prepare resins from the aryl alkylol amines and polybasic acids, it is obvious that these same aryl alkylol amines can be incorporated into alkyd resins during the process of manufacture and a resin obtained which combines the advantages obtained by blending the two resins.

Tests have established that the new stabilizers are about twice as effective as the best of other nitrogen-containing resins as stabilizers for coatings of this type, and they are several times more effective than those of the inorganic base type. For instance, a film of a conjoint polymer of vinyl chloride with vinyl acetate containing 1% phenyl monoisopropanolamine succinate resin remained practically colorless after baking for 15 minutes on a steel panel at 350° F., whereas a similar film containing 1% of an alkyd resin and 1% of a urea-formaldehyde-alcohol resin was badly discolored after a similar bake. In order to obtain equivalent heat stabilities employing the urea-formaldehyde resin stabilizers, approximately twice as much stabilizer must be used as is required with the stabilizing resins of this invention.

In still other tests, the new aryl monalkylolamine resinous ester-amides with dicarboxylic acids were compared with a stabilizer of the inorganic type which has good stabilizing qualities, namely, dibutyl tin acetate. The stabilizer representative of this invention was the endo methylene hexahydrophthalic acid resinous ester-amide of phenyl monoethanolamine

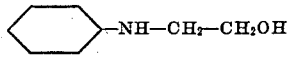

Lacquers having a base of a conjoint polymer of vinyl chloride with vinyl acetate containing the two stabilizers in varying amount were prepared and films of approximately 0.0010 inch thick were applied to clean steel panels by dipping. After drying, the panels were baked in an oven under identical conditions at 350° F. The appearance of each film after different times of baking is given below, on a scale in which 10 represents a colorless film, 5 represents a dark film with first traces of black and 0 represents a black, completely charred film. Intermediate numbers represent intermediate gradations in color.

*Conditions of film after baking at 350° F.*

| Test No. | 1 | 2 | 3 | 4 | 5 |
|---|---|---|---|---|---|
| Vinyl chloride-vinyl acetate copolymer, parts | 100 | 100 | 100 | 100 | 100 |
| Stabilizer, parts | None | | | | |
| Phenyl monoethanolamine resin of endo methylene hexahydrophthalic acid | | 1 | 2 | | |
| Dibutyl tin diacetate | | | | 1 | 2 |
| Time of Bake, Minutes: | | | | | |
| 10 | 1 | 10 | 10 | 1 | 10 |
| 20 | 0 | 9 | 10 | 0 | 1 |
| 30 | 0 | 1 | 10 | 0 | 0 |
| 30 | 0 | 0 | 9 | 0 | 0 |
| 40 | 0 | 0 | 9 | 0 | 0 |
| 50 | 0 | 0 | 8 | 0 | 0 |
| 60 | 0 | 0 | 6 | 0 | 0 |
| 70 | 0 | 0 | 4 | 0 | 0 |

The following examples are intended to illustrate the principle of the invention.

*Example 1*

A white pigmented lacquer of the following composition was prepared:

| | Per cent |
|---|---|
| Titanium dioxide | 12.5 |
| Conjoint polymer vinyl chloride-vinyl acetate, vinyl chloride content about 87%, average molecular weight about 9000 | 17.2 |
| Phenyl monoethanolamine phthalate resin stabilizer | 0.13 |
| Di(beta-butoxyethyl) phthalate | 3.2 |
| Methyl isobutyl ketone | 33.77 |
| Toluene | 33.2 |
| Total | 100.00 |

This lacquer was applied without a primer coating to a steel panel and baked for 30 minutes at 325° F. A perfectly white and adherent coating was obtained which showed no decomposition or weakness in film strength, and which had no decreased resistance to water, oils, acids and alkalies. This coating schedule is a distinct advance in the art, since heretofore stabilizing lead pigments have been advocated for use in baked pigmented coatings containing resins applied directly to metal without a stabilizing primer. Since most of the stabilizing pigments are too dark in color to be masked by other pigments, the colors heretofore obtainable with one coat finishes were definitely limited.

*Example 2*

A film of a conjoint polymer of vinyl chloride with vinyl acetate containing 2% of a resin prepared from phenyl monoisopropanolamine and phthalic anhydride when heated on steel for 30 minutes at 350° F., remained clear and colorless.

The following examples present in tabular form the diverse number and form of stabilizing resins which are useful in the practice of this invention. The resins were prepared by refluxing the ingredients, usually in the presence of a diluent, until the desired degree of resinification occurred. The reaction was stopped while the resins remained soluble in the usual lacquer thinners, such as mixtures of ketones and aromatic hydrocarbons.

| Ex. No. | Aryl Alkylolamine | Dibasic Acid | Mols of Amine | Mols of Acid | Mols Water Removed |
|---|---|---|---|---|---|
| 3 | Phenyl monoethanolamine | Endo-methylene hexahydrophthalic anhydride | 1 | 1 | 1.0 |
| 4 | ....do.... | Phthalic anhydride | 1 | 1 | 0.95 |
| 5 | Phenyl monoisopropanolamine | ....do.... | 1.5 | 1.5 | 1.4 |
| 6 | ....do.... | Maleic anhydride | 1 | 1 | 0.73 |
| 7 | ....do.... | Succinic acid | 1 | 1 | 1.9 |
| 8 | ....do.... | {Maleic anhydride, ½ / Phthalic anhydride, ½} | 1 | 1 | 0.8 |
| 9 | ....do.... | {Maleic anhydride, ¼ / Phthalic anhydride, ¾} | 1 | 1 | 0.9 |

While the resins described above are prepared from equivalent quantities of alkylolamines and dibasic acids stabilizing resins can be prepared with either an excess of acid or of alkylolamines. The use of equivalent quantities of reactants result in a resin of longer chain length when the reaction has been carried as near completion as possible. Such resins are generally preferred because they are tougher, more flexible and have better resistance to water.

The above resins were tested as heat stabilizers for films of a conjoint polymer of vinyl chloride with vinyl acetate when baked on steel. All had significant stabilizing quantities, although the maleate and succinate resins appeared better on an equal weight basis because of their higher nitrogen content. On the other hand, the phthalate resins are more water resistant than the succinate resins. The maleate resins are difficult to prepare because of the tendency for cross-linking and consequent insolubilization of the resin to occur, but this is a favorable property on baking the stabilized chlorine-containing resins, as the films become more resistant to moisture and chemicals because of the insolubilization of the maleate resin which occurs. The resins prepared from the long chain dibasic acids, such as adipic, sebacic, azelaic, pimelic and suberic acids are softer than the succinate or phthalate resins, and thus they are somewhat easier to disperse in the chlorine-containing resins to be stabilized.

It is obvious that many resinous ester-amides of aryl monoalkylolamines and dicarboxylic acids other than are shown in the foregoing examples may be prepared, and the invention as herein described is applicable to all such compounds as stabilizers for chlorine-containing resins which are subject to deterioration on exposure to heat.

The resinous stabilizers contemplated herein vary in form from soft balsam like materials to hard brittle resins depending upon the polybasic acid used and the molar proportions of the ingredients. The resins which are prepared from the saturated dibasic acids are soluble in the usual solvents for the vinyl chloride polymers, namely ketones or mixtures of these with aromatic hydrocarbons, such as a mixture of equal parts of methyl isobutyl ketone and toluene. Other common solvents for the unmodified alkyd resins, such as butyl acetate will dissolve these new resins except those resins which contain unsaturated acids such as maleic acid and which have undergone appreciable polymerization either during manufacture or subsequent treatment.

The resinous stabilizers are not subject to volatilization during heating as occurs with many volatile stabilizers. They do not detract from the adhesion of the vinyl resins to metallic surfaces. Furthermore the resins are insoluble in water and do not detract from the water resistance of the vinyl resins coating to the extent that do water soluble stabilizers or stabilizers that yield water soluble products after reacting with hydrogen chloride.

The resins which contain unsaturated acids and are therefore heat hardening are characterized by extremely good resistance to moisture.

The alkylol amine resins are sufficiently compatible with the vinyl chloride-vinyl acetate copolymers to yield transparent films of adequate heat stability and the color is sufficiently light that even white coatings can be prepared.

This application is a continuation-in-part of my application Serial No. 460,126, filed September 29, 1942, now Patent 2,394,010.

What is claimed is:

1. A plastic composition comprising a chlorine-containing resin normally subject to deterioration on exposure to heat and, as in inhibitor of such deterioration, a ketone-soluble resinous ester-amide of a dicarboxylic acid and an aryl secondary monoalkylamine containing from two to three carbon atoms in the alkylol radical and having the hydroxyl group in the beta position.

2. A coating composition comprising a vinyl resin containing vinyl chloride polymerized therein and, as a stabilizer therefor, a ketone-soluble resinous ester-amide of a dicarboxylic acid and an aryl secondary monoalkylolamine containing from two to three carbon atoms in the alkylol radical and having the hydroxyl group in the beta position.

3. A plastic composition comprising a conjoint polymer of vinyl chloride with vinyl acetate and, as a stabilizer therefor, a ketone-soluble resinous ester-amide of a dicarboxylic acid and an aryl secondary monoalkylolamine containing from two to three carbon atoms in the alkylol radical and having the hydroxyl group in the beta position.

4. A coating composition comprising a conjoint polymer of vinyl chloride with vinyl acetate and, as a stabilizer therefor, a ketone-soluble resinous ester amide of a dicarboxylic acid and an aryl secondary monoethanolamine.

5. A stabilized plastic composition comprising polyvinyl chloride and, as a stabilizer therefor, a ketone-soluble resinous ester-amide of a di-carboxylic acid and an aryl secondary monoalkylolamine containing from two to three carbon atoms in the alkylol radical and having the hydroxyl group in the beta position.

6. A coating composition comprising a chlorine-containing resin normally subject to deterioration on exposure to heat and, as an inhibitor of such deterioration, a ketone-soluble resincus ester-amide of a dicarboxylic acid and an aryl secondary monoethanolamine.

7. A plastic composition comprising a vinyl resin containing vinyl chloride polymerized therein and, as a stabilizer therefor, from 0.5% to 8% by weight of the vinyl resin of a ketone-soluble resinous ester-amide of a dicarboxylic acid and an aryl secondary monoethanolamine.

8. A plastic composition comprising a chlorine-containing resin normally subject to deterioration on exposure to heat, and as an inhibitor of such deterioration, a ketone-soluble resinous ester-amide of phenyl monoisopropanolamine and succinic acid.

9. A plastic composition comprising a chlorine-containing resin normally subject to deterioration on exposure to heat, and as an inhibitor of such deterioration, a ketone-soluble resinous ester-amide of phenyl monoethanolamine and endomethylene hexahydrophthalic acid.

10. A plastic composition comprising a chlorine-containing resin normally subject to deterioration on exposure to heat, and as an inhibitor of such deterioration, a ketone-soluble resinous ester-amide of phenyl monoethanolamine and phthalic acid.

RICHARD W. QUARLES.

REFERENCES CITED

The following references are of record in the file of this patent:

UNITED STATES PATENTS

| Number | Name | Date |
|---|---|---|
| 2,379,936 | Sloan | July 10, 1945 |
| 2,379,413 | Bradley | July 3, 1945 |